United States Patent
Yang et al.

(10) Patent No.: US 11,984,563 B1
(45) Date of Patent: May 14, 2024

(54) METHOD FOR CAPACITY RECOVERY OF LITHIUM-ION SECONDARY BATTERY

(71) Applicant: CONTEMPORARY AMPEREX TECHNOLOGY CO., LIMITED, Ningde (CN)

(72) Inventors: Longfei Yang, Ningde (CN); Limei Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/413,093

(22) Filed: Jan. 16, 2024

Related U.S. Application Data

(63) Continuation of application No. PCT/CN2022/124022, filed on Oct. 9, 2022.

(30) Foreign Application Priority Data

Nov. 1, 2021 (CN) .......................... 202111285147.6

(51) Int. Cl.
*H01M 10/42* (2006.01)
*H01M 10/0525* (2010.01)
(Continued)

(52) U.S. Cl.
CPC ... *H01M 10/4235* (2013.01); *H01M 10/0525* (2013.01); *H01M 10/0567* (2013.01); *H01M 50/609* (2021.01)

(58) Field of Classification Search
CPC ......... H01M 10/4235; H01M 10/0525; H01M 10/0567; H01M 50/609
See application file for complete search history.

(56) References Cited

U.S. PATENT DOCUMENTS

2012/0212186 A1 8/2012 Fujii et al.
2013/0330607 A1* 12/2013 Mizuno ............ H01M 10/0525
429/188

FOREIGN PATENT DOCUMENTS

CN 103187595 A 7/2013
CN 108346824 A * 7/2018
(Continued)

OTHER PUBLICATIONS

Machine Translation of JP 2016058335 A (Mar. 3, 2024) (Year: 2024).*

(Continued)

*Primary Examiner* — Matthew J Merkling
(74) *Attorney, Agent, or Firm* — Kilpatrick Townsend & Stockton LLP

(57) ABSTRACT

This application provides a method for capacity recovery of lithium-ion secondary battery. The method includes the following steps:
(1) providing a capacity-degraded lithium-ion secondary battery;
(2) providing a capacity recovery agent, the capacity recovery agent including a p-phenylenediamine compound, a lithium salt, and an organic solvent, and the organic solvent being used to dissolve the p-phenylenediamine compound and the lithium salt;
(3) injecting the capacity recovery agent into the lithium-ion secondary battery;
(4) enabling the capacity recovery agent to react inside the lithium-ion secondary battery; and
(5) pouring out the liquid mixture inside the lithium-ion secondary battery after reaction and injecting an electrolyte into the lithium-ion secondary battery.

18 Claims, 1 Drawing Sheet

(51) Int. Cl.
*H01M 10/0567* (2010.01)
*H01M 50/609* (2021.01)

(56) References Cited

FOREIGN PATENT DOCUMENTS

| | | | |
|---|---|---|---|
| CN | 108346824 A | | 7/2018 |
| CN | 109728361 A | | 5/2019 |
| CN | 109831926 A | | 5/2019 |
| JP | 2011076930 A | | 4/2011 |
| JP | 2016058335 A | * 4/2016 | ........ H01M 10/0562 |

OTHER PUBLICATIONS

Machine translation of CN 108346824 A (Mar. 5, 2024) (Year: 2024).*
International Search Report received in the corresponding international application PCT/CN2022/124022, mailed on Nov. 28, 2022.
Written Opinion of ISA received in the corresponding international application PCT/CN2022/124022, mailed on Nov. 28, 2022.

* cited by examiner

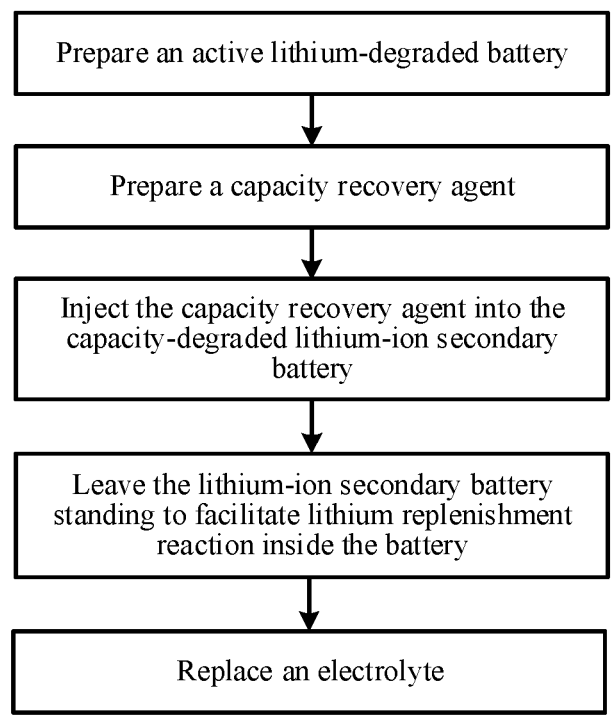

METHOD FOR CAPACITY RECOVERY OF LITHIUM-ION SECONDARY BATTERY

CROSS-REFERENCE TO RELATED APPLICATIONS

This application is a continuation of international application PCT/CN2022/124022, filed on Oct. 9, 2022, which claims priority to Chinese application 202111285147.6, filed on Nov. 1, 2021 and entitled "METHOD FOR CAPACITY RECOVERY OF LITHIUM-ION SECONDARY BATTERY", the content of which is incorporated herein by reference in its entirety.

TECHNICAL FIELD

The present invention relates to the field of lithium-ion secondary batteries, and specifically relates to a method for capacity recovery of lithium-ion secondary battery, as well as a lithium-ion secondary battery obtained using this method.

BACKGROUND

In recent years, with increasingly wide use of lithium-ion secondary batteries, lithium-ion batteries have been widely used in energy storage power supply systems such as hydroelectric, thermal, wind, and solar power plants, and many other fields including electric tools, electric bicycles, electric motorcycles, electric vehicles, military equipment, and aerospace. However, due to repeated use, the capacity of lithium-ion secondary batteries gradually decreases, affecting their service life and safety. Currently, there is a lack of in-depth research on capacity recovery of capacity-degraded lithium-ion secondary batteries.

SUMMARY

The purpose of the present invention is to provide a method for efficiently and accurately recovering the capacity of a lithium-ion secondary battery using a capacity recovery agent, and the capacity recovery agent does not leave a significant amount of residue inside the secondary battery, ensuring the cycling stability of the secondary battery during subsequent use.

To achieve the purpose, this application provides a method for capacity recovery of lithium-ion secondary battery. The method includes the following steps:

(1) providing a capacity-degraded lithium-ion secondary battery;
(2) providing a capacity recovery agent, the capacity recovery agent including a p-phenylenediamine compound, a lithium salt, and an organic solvent, and the organic solvent being used to dissolve the p-phenylenediamine compound and the lithium salt;
(3) injecting the capacity recovery agent into the lithium-ion secondary battery;
(4) enabling the capacity recovery agent to react inside the lithium-ion secondary battery; and
(5) pouring out the liquid mixture inside the lithium-ion secondary battery after reaction and injecting an electrolyte into the lithium-ion secondary battery.

Accordingly, by using a specified type of capacity recovery agent and replacing the electrolyte after the reaction of the capacity recovery agent, the capacity of the lithium-ion secondary battery is effectively recovered while the cycling stability of the secondary battery is ensured.

In any embodiment, in step (1), the capacity-degraded lithium-ion secondary battery is an active lithium-degraded battery, and the capacity required to be recovered for the capacity-degraded lithium-ion secondary battery is C. A calculation method for C is as follows:

$$C = C2 + C3 - C1,$$

where $C2 = C1/(1-P1)$, where
P1 is the active lithium loss rate of the capacity-degraded lithium-ion secondary battery;
C1 is the discharge capacity of the capacity-degraded lithium-ion secondary battery in a current state;
C2 is the discharge capacity of the lithium-ion secondary battery under a condition that the positive electrode material maximally accommodates active lithium; and
C3 is the capacity required to be charged to the capacity-degraded lithium-ion secondary battery by charging before capacity recovery; where each of the above capacities is measured in Ah.

As a result, the capacity required to be recovered for the lithium-ion secondary battery can be accurately calculated, enabling targeted and precise control of the capacity recovery of the lithium-ion secondary battery.

In any embodiment, the capacity-degraded lithium-ion secondary battery has an active lithium loss rate P1 of greater than or equal to 5%. Therefore, the method of the present invention can be used for capacity recovery of the lithium-ion secondary battery.

In any embodiment, in step (2), the mass $m_1$ of the p-phenylenediamine compound to be added to the capacity recovery agent and the capacity C to be recovered for the capacity-degraded lithium-ion secondary battery satisfy:

$$m_1 = C * M_1 * 1000 / (M_{li} * 3860), \text{ where}$$

$M_1$ represents the relative molecular mass of the p-phenylenediamine compound in g/mol.
$M_{li}$ represents the relative atomic mass of lithium atoms, in g/mol, and 3860 represents the gram capacity of lithium metal, in mAh/g.

In any embodiment, in step (2), the mass $m_2$ of the lithium salt to be added to the capacity recovery agent and the capacity C to be recovered for the capacity-degraded lithium-ion secondary battery satisfy:

$$m_2 = C * M_2 * 1000 / (n * M_1 * 3860), \text{ where}$$

$M_2$ represents the relative molecular mass of the lithium salt, in g/mol,
n represents the number of lithium atoms in the lithium salt,
$M_1$ represents the relative atomic mass of Li atoms, in g/mol, and
3860 represents the gram capacity of lithium metal, in mAh/g.

As a result, the required mass of p-phenylenediamine compound and lithium salt can be precisely calculated, thereby precisely controlling the capacity required to be recovered for the lithium-ion secondary battery.

In any embodiment, the p-phenylenediamine compound is selected from the compounds represented by formula 1 and/or formula 2:

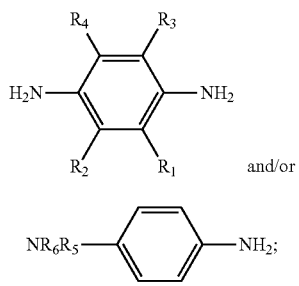

Formula 1 and/or

Formula 2

NR₆R₅—⬡—NH₂;

where $R_1$, $R_2$, $R_3$ and $R_4$ are each independently a straight-chain or branched-chain alkyl group having 1 to 3 carbon atoms or hydrogen; and $R_5$ and $R_6$ are each independently hydrogen or a straight-chain or branched-chain alkyl group having 1 to 3 carbon atoms. As a result, the p-phenylenediamine compound, together with the lithium salt, reacts with the lithium-degraded positive electrode to undergo a positive electrode lithium replenishment reaction, thereby recovering the capacity of the lithium-ion secondary battery.

In any embodiment, the lithium salt is selected from one or more of lithium perchlorate, lithium tetrafluoroborate, lithium hexafluoroarsenate, lithium hexafluorophosphate, lithium bisoxalate borate, lithium difluorooxalate borate, lithium bisdifluorosulfonimide, LiCl, and LiBr. Thereby, the lithium salt, together with the p-phenylenediamine compound, reacts with the lithium-degraded positive electrode to undergo a positive electrode lithium replenishment reaction, thereby recovering the capacity of the lithium-ion secondary battery.

In any embodiment, in the capacity recovery agent, the p-phenylenediamine compound has a percentage of 0.5-15 wt %, and the lithium salt has a percentage of 0.5-15 wt %, preferably 0.5-6 wt %; where all of the above percentages are based on a total mass of the capacity recovery agent. Thereby, specified percentages of the lithium salt and p-phenylenediamine compound in the capacity recovery agent ensure moderate viscosity and better reaction with the electrode plate in the battery, thus recovering the capacity of the lithium-ion secondary battery.

In any embodiment, in step (2), the organic solvent includes a cyclic carbonate and a low-viscosity solvent. Therefore, the specifically composed organic solvents better dissolve the lithium salt and p-phenylenediamine compound, thereby recovering the capacity of the lithium-ion secondary battery.

In any embodiment, the cyclic carbonate is ethylene carbonate (EC), propylene carbonate (PC), or a combination thereof; and the cyclic carbonate has a percentage of 10-30 wt % based on a total mass of the organic solvent. Thereby, the cyclic carbonate has a high dielectric constant, which ensures that the lithium salt and the p-phenylenediamine compound have a large solubility in the organic solvent.

In any embodiment, the low-viscosity solvent is one or more of dimethyl carbonate, diethyl carbonate, methyl ethyl carbonate, methyl propyl carbonate, methyl formate, ethyl formate, methyl acetate, ethyl acetate, propyl propionate, ethyl butyrate, ethyl propionate, propyl butyrate, tetrahydrofuran, and 1,3-dioxocyclopentane; and the low-viscosity solvent has a percentage of 70-90 wt % based on the mass of the organic solvent. Thereby, the low-viscosity solvent of a specified type and percentage alleviates the high viscosity of cyclic carbonate, ensuring sufficient infiltration inside the battery and thus guaranteeing the capacity recovery of the lithium-ion secondary battery.

In any embodiment, in step (4), the capacity recovery agent reacts inside the lithium-ion secondary battery by being allowed to stand at a temperature of 20° C. to 60° C. Under the reaction conditions, the capacity recovery agent sufficiently infiltrates the interior of the lithium-ion secondary battery to ensure capacity recovery of the lithium-ion secondary battery.

In any embodiment, in step (4), the capacity recovery agent reacts inside the lithium-ion secondary battery by ultrasound or heating. This accelerates the infiltration of the capacity recovery agent into an electrode plate in the lithium-ion secondary battery, speeds up the reaction rate, and improves the efficiency of capacity recovery of the secondary battery.

In any embodiment, in step (5), after the liquid mixture inside the lithium-ion secondary battery after reaction is poured out, an organic cleaning agent is injected for cleaning, followed by vacuum drying, and finally, the electrolyte is injected into the lithium-ion secondary battery. As a result, there is no residue of the capacity recovery agent inside the battery, ensuring the cycling stability and safety of the lithium-ion secondary battery after capacity recovery.

A second aspect of this application provides a lithium-ion secondary battery, characterized in that the lithium-ion secondary battery is a lithium-ion secondary battery obtained by the method according to the first aspect of this application, where a positive electrode active material of the lithium-ion secondary battery is at least one of a lithium cobalt oxide, a lithium nickel oxide, a lithium manganese oxide, a lithium nickel cobalt oxide, a lithium manganese cobalt oxide, a lithium nickel-manganese oxide, a lithium nickel cobalt manganese oxide, a lithium nickel cobalt aluminum oxide, and an olivine-structured lithium-containing phosphate, and optionally, the olivine-structured lithium-containing phosphate is at least one of lithium iron phosphate, a composite material of lithium iron phosphate and carbon, lithium manganese phosphate, a composite material of lithium manganese phosphate and carbon, lithium manganese-iron phosphate, and a composite material of lithium manganese-iron phosphate and carbon.

A third aspect of this application provides a battery module including the secondary battery according to the second aspect of this application.

A fourth aspect of this application provides a battery pack including the battery module according to the third aspect of this application.

A fifth aspect of this application provides an electric apparatus including at least one selected from the secondary battery according to the second aspect of this application, the battery module according to the third aspect of this application, or the battery pack according to the fourth aspect of this application.

In this application, a capacity recovery agent containing specified types and amounts of p-phenylenediamine compounds and lithium salts is added to a capacity-degraded lithium-ion secondary battery to replenish active lithium to the positive electrode plate inside the lithium-ion secondary battery, ensuring efficient and precise control of capacity recovery of a lithium-ion secondary battery. In addition, after the reaction of the capacity recovery agent, an electrolyte is replaced to eliminate the impact of the capacity recovery agent on the safety and cycling stability of the lithium-ion secondary battery during subsequent operation.

BRIEF DESCRIPTION OF DRAWINGS

FIG. 1 is a flowchart of a method of a preferred embodiment of this application.

DESCRIPTION OF EMBODIMENTS

The following specifically discloses in detail embodiments of a method for capacity recovery of lithium-ion secondary battery, a corresponding secondary battery, a battery module, a battery pack, and an electric apparatus of this application with appropriate reference to the accompanying drawings. However, there may be cases where unnecessary detailed descriptions are omitted. For example, detailed descriptions of well-known matters and repeated descriptions of actually identical structures have been omitted. This is to avoid unnecessarily prolonging the following description, for ease of understanding by persons skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits. A given range is defined by one lower limit and one upper limit selected, where the selected lower and upper limits define boundaries of that particular range.

Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions.

Unless otherwise specified, all the technical features and optional technical features of this application can be combined with each other to form new technical solutions.

Unless otherwise specified, all the steps in this application can be performed in the order described or in random order, preferably, in the order described. For example, a method including steps (a) and (b) indicates that the method may include steps (a) and (b) performed in order or may include steps (b) and (a) performed in order. For example, the foregoing method may further include step (c), which indicates that step (c) may be added to the method in any ordinal position, for example, the method may include steps (a), (b), and (c), steps (a), (c), and (b), steps (c), (a), and (b), or the like.

Unless otherwise specified, "include" and "contain" mentioned in this application are inclusive or may be exclusive. For example, the terms "include" and "contain" can mean that other unlisted components may also be included or contained, or only listed components are included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

Currently, lithium-ion secondary batteries are widely used in various fields and are used in huge quantities. However, during use, the capacity of lithium-ion secondary batteries gradually decreases due to repeated charging and discharging. Most of the existing technical solutions involve adding lithium replenishing additives to the fresh battery cells, resulting in a higher initial active lithium content in the battery cells. However, these solutions do not involve capacity recovery after capacity degradation. There is very little research on capacity recovery of capacity-degraded secondary batteries, and the existing literature only mentions the addition of capacity recovery agents to capacity-degraded secondary batteries. However, the capacity recovery achieved is limited, and precise control of capacity recovery cannot be achieved. Furthermore, the capacity recovery agent remains in the electrolyte system after capacity recovery, which affects the cycling stability of the battery cells in subsequent stages. Through extensive research, the inventors of the present invention have discovered that the method according to the first aspect of this application achieves efficient and precise capacity recovery of lithium-ion secondary batteries by precisely controlling the addition of capacity recovery agents containing specified types and amounts of p-phenylenediamine compounds and lithium salts, and by replacing the electrolyte after the reaction of the capacity recovery agent. The capacity recovery agent does not leave any residue inside the secondary battery, ensuring the cycling stability of the secondary battery during subsequent use.

Method for Capacity Recovery of Lithium-Ion Secondary Battery

In an embodiment of this application, referring to FIG. 1, this application proposes a method for capacity recovery of lithium-ion secondary battery, including the following steps:

(1) providing a capacity-degraded lithium-ion secondary battery;

(2) providing a capacity recovery agent, the capacity recovery agent including a p-phenylenediamine compound, a lithium salt, and an organic solvent, and the organic solvent being used to dissolve the p-phenylenediamine compound and the lithium salt;

(3) injecting the capacity recovery agent into the lithium-ion secondary battery;

(4) enabling the capacity recovery agent to react inside the lithium-ion secondary battery; and (5) pouring out the liquid mixture inside the lithium-ion secondary battery after reaction and injecting an electrolyte into the lithium-ion secondary battery.

Although the mechanism is not yet clear, this applicant unexpectedly discovered that: by using a capacity recovery agent containing a p-phenylenediamine compound and a lithium salt, and by replacing the electrolyte after the reaction of the capacity recovery agent, the capacity of the lithium-ion secondary battery is effectively recovered while the cycling stability for subsequent use of the secondary battery is ensured. Specifically, taking lithium iron phosphate lithium-ion secondary batteries as an example, lithium ions in the p-phenylenediamine compound and lithium salts react with iron phosphate on the lithium-degraded positive electrode to generate lithium iron phosphate. In this reaction process, lithium in the lithium salts acts as an external lithium source and undergoes redox reactions to enter the positive electrode, increasing the total amount of available active lithium inside the secondary battery and thus achieving capacity recovery of the secondary battery.

The term "active lithium" means lithium ions that can participate in the redox reaction during the charging and discharging process within the battery.

In some embodiments, in step (1), the capacity-degraded lithium-ion secondary battery is an active lithium-degraded battery, and the capacity required to be recovered for the capacity-degraded lithium-ion secondary battery is C. A calculation method for C is as follows:

$$C = C2 + C3 - C1,$$

where $C2 = C1/(1-P1)$, where

P1 is the active lithium loss rate of the capacity-degraded lithium-ion secondary battery;

C1 is the discharge capacity of the capacity-degraded lithium-ion secondary battery in a current state;

C2 is the discharge capacity of the lithium-ion secondary battery under a condition that the positive electrode material maximally accommodates active lithium; and C3 is the capacity required to be charged to the capacity-degraded lithium-ion secondary battery by charging before capacity recovery; where each of the above capacities is measured in Ah.

As a result, the capacity required to be recovered for the lithium-ion secondary battery can be accurately calculated, enabling targeted and precise control of the capacity recovery of the lithium-ion secondary battery.

The "active lithium-degraded battery" is a secondary battery in which the active lithium in the positive electrode gradually decreases after the first formation and/or during use.

The calculation method for the active lithium loss rate P1 of the capacity-degraded lithium-ion secondary battery is as follows:

$$\text{Active lithium loss rate } P1 = (C20 - C10)/C20;$$

where C10 represents the capacity corresponding to the current state of active lithium on a 154.025 mm² battery cathode; C20 represents the capacity corresponding to the maximum accommodation of active lithium on a 154.025 mm² battery cathode.

C10 and C20 are tested as follows:

A full-discharged cathode electrode plate is taken and cut into a circular piece with an area of 154.025 mm² using a punching machine and prepare a button cell with the cathode containing lithium. The button cell is charged according to the charging process shown in Table 1, and the charge capacity is recorded as C10. The button cell is discharged and then recharged according to the process shown in Table 2, and the recharge capacity is recorded as C20 (without considering the loss of active lithium due to the loss of active material in the cathode). The $U_1$ and $U_2$ values for different lithium-ion secondary batteries are shown in Table 3.

TABLE 1

Charging process of the button cell

| Step | Operation | Note |
|---|---|---|
| 1 | Stand for 2 h | |
| 2 | Charge at a constant current of 0.04 C to $U_1$ and then charge at a constant voltage to a current less than 10 μA. | Obtain C10 |
| 3 | Stand for 3 min | |

Note:
"0.04 C" indicates a current of 0.04 times the capacity.

TABLE 2

Discharge and recharge process of button cell

| Step | Operation | Note |
|---|---|---|
| 1 | Discharge at a constant current of 0.04 C to $U_2$ | |
| 2 | Stand for 3 min | |
| 3 | Discharge at a constant current of 50 μA to $U_2$ | |
| 4 | Stand for 3 min | |
| 5 | Discharge at a constant current of 10 μA to $U_2$ | |
| 6 | Stand for 3 min | |
| 7 | Charge at a constant current of 0.04 C to $U_1$ and charge at a constant voltage to a current less than 10 μA | Obtain C20 |
| 8 | Stand for 3 min | |

TABLE 3

$U_1$ and $U_2$ for different lithium-ion secondary batteries

| Positive electrode active material | $U_1$ (V) | $U_2$ (V) |
|---|---|---|
| Lithium iron phosphate | 3.75 | 2 |
| NCM532 | 4.25 | 2.8 |
| Lithium cobaltate | 4.25 | 2.8 |
| Lithium manganate | 4.3 | 2.5 |

When the secondary battery is undergoing capacity recovery in a fully discharged state, C3 is 0 Ah, and thus $C = C2 - C1$.

In some embodiments, the active lithium loss rate P1 of the capacity-degraded lithium-ion secondary battery is greater than or equal to 5%. Therefore, the method of the present invention can be used for capacity recovery of the lithium-ion secondary battery.

In some embodiments, in step (2), the mass $m_1$ of the p-phenylenediamine compound to be added to the capacity recovery agent and the capacity C to be recovered for the capacity-degraded lithium-ion secondary battery satisfy:

$$m_1 = C \cdot M_1 \cdot 1000/(M_{li} \cdot 3860).$$

where $M_1$ represents the relative molecular mass of the p-phenylenediamine compound in g/mol.

$M_{li}$ represents the relative atomic mass of lithium atoms, in g/mol, and 3860 represents the gram capacity of lithium metal, in mAh/g.

In some embodiments, in step (2), the mass $m_2$ of the lithium salt to be added to the capacity recovery agent and the capacity C to be recovered for the capacity-degraded lithium-ion secondary battery satisfy:

$$m_2 = C \cdot M_2 \cdot 1000/(n \cdot M_1 \cdot 3860).$$

where $M_2$ represents the relative molecular mass of the lithium salt, in g/mol.

n represents the number of lithium atoms in the lithium salt, $M_1$; represents the relative atomic mass of Li atoms, in g/mol, and 3860 represents the gram capacity of lithium metal, in mAh/g.

As a result, the required mass of p-phenylenediamine compound and lithium salt can be precisely calculated, thereby precisely controlling the capacity required to be recovered for the lithium-ion secondary battery.

In some embodiments, the p-phenylenediamine compound is selected from compounds represented by formula 1 and/or formula 2:

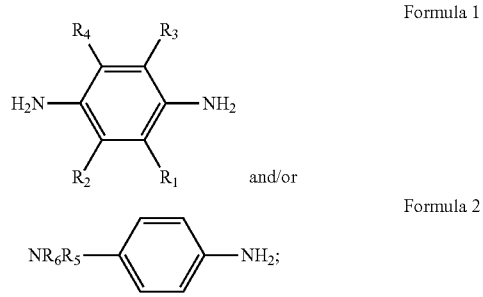

where $R_1$, $R_2$, $R_3$ and $R_4$ are each independently a straight-chain or branched-chain alkyl group having 1 to 3 carbon atoms or hydrogen, preferably methyl, ethyl, or hydrogen; and $R_5$ and $R_6$ are each independently hydrogen or a straight-chain or branched-chain alkyl group having 1 to 3 carbon atoms, preferably hydrogen, methyl, or ethyl. Preferably, the p-phenylenediamine compounds are tetramethyl-p-phenylenediamine (TMPD), N,N-dimethyl-p-phenylenediamine, and N,N-diethyl-p-phenylenediamine.

In some embodiments, the lithium salt is selected from one or more of lithium perchlorate, lithium tetrafluoroborate, lithium hexafluoroarsenate, lithium hexafluorophosphate, lithium bisoxalate borate, lithium difluorooxalate borate, lithium bisdifluorosulfonimide, LiCl, and LiBr; preferably lithium hexafluorophosphate, lithium perchlorate, and LiBr.

In the charging process of the lithium-ion secondary battery, the following reaction occurs at the positive electrode:

$$LiMO_2 \longrightarrow Li_{1-x}MO_2 + xLi^+ + xe-.$$

After the loss of active lithium, the positive electrode contains lithium-degraded positive electrode $Li_{1-x}MO_2$. After the capacity recovery agent is injected into the battery, the lithium salts and p-phenylenediamine compounds (taking TMPD as an example) react with the lithium-degraded positive electrode, resulting in a positive electrode lithium replenishment reaction:

$$Li_{1-x}MO_2 + XLi^+ + TMPD \longrightarrow LiMO_2 + TMPD^+$$

This increases a total amount of active lithium in the battery system, recovering the capacity of the lithium-ion secondary battery and effectively extending the life of the battery.

In some embodiments, the percentage of the p-phenylenediamine compound in the capacity recovery agent is 0.5-15 wt %, preferably 0.5-5 wt %, and the percentage of the lithium salt is 0.5-15 wt %, preferably 0.5-6 wt %. The above percentages are based on a total mass of the capacity recovery agent. Thereby, specified percentages of the lithium salt and p-phenylenediamine compound in the capacity recovery agent ensure moderate viscosity and better reaction with the electrode plate in the battery, thus recovering the capacity of the lithium-ion secondary battery. When the capacity required to be recovered for the lithium-ion secondary battery is fixed, a lower concentration of lithium salt in the capacity recovery agent requires a larger total amount of the capacity recovery agent. Therefore, the concentration of the lithium salt should not be less than 0.5 wt %. In addition, a higher concentration of the lithium salt results in a higher viscosity of the capacity recovery agent, making it difficult for the capacity recovery agent to diffuse on the electrode plate, leading to uneven capacity recovery in the cathode electrode plate, and even the inability of the capacity recovery agent to react with the middle portion of the electrode plate, resulting in incomplete capacity recovery. Therefore, the concentration of the lithium salt should not exceed 15 wt %.

In some embodiments, in step (2), the organic solvent includes a cyclic carbonate and a low-viscosity solvent. The cyclic carbonate has a high dielectric constant, ensuring that the p-phenylenediamine compound and the lithium salt have high solubility in the organic solvent, thereby achieving the desired capacity recovering effect even with a small amount of capacity recovery agent. However, the cyclic carbonate has a high viscosity, which affects the diffusion of the capacity recovery agent between electrode plates, preventing the electrode plate from being infiltrated properly and participation in the reaction, or reducing the reaction time with the solvent recovery agent in the middle of the electrode plate, thereby preventing proper activation of the middle of the electrode plate. In this case, a low-viscosity solvent is added to reduce the viscosity of the system, ensuring sufficient infiltration into the electrode plate and proper activation of the middle of the electrode plate.

In some embodiments, the cyclic carbonate is ethylene carbonate (EC), propylene carbonate (PC), or a combination thereof, preferably ethylene carbonate; and the cyclic carbonate has a percentage of 10-30 wt %, preferably 20-30 wt %, based on a total mass of the organic solvent. Thereby, the cyclic carbonate of a specified type further ensures high solubility of the lithium salt and p-phenylenediamine compound in the organic solvent, allowing for the desired capacity recovery effect even with a small amount of capacity recovery agent.

In some embodiments, the low-viscosity solvent is one or more of dimethyl carbonate (DMC), diethyl carbonate, methyl ethyl carbonate, methyl propyl carbonate, methyl formate, ethyl formate, methyl acetate, ethyl acetate, propyl propionate, ethyl butyrate, ethyl propionate, propyl butyrate, tetrahydrofuran, and 1,3-dioxocyclopentane, and is preferably dimethyl carbonate; and the low-viscosity solvent has a percentage of 70-90 wt %, preferably 70-80 wt %, based on the mass of the organic solvent. Thereby, the low-viscosity solvent of a specified type and percentage alleviates the high viscosity of cyclic carbonate, ensuring sufficient infiltration inside the battery and thus guaranteeing the capacity recovery of the lithium-ion secondary battery.

In some embodiments, in step (3), the capacity recovery agent is injected into the capacity-degraded lithium-ion battery. The electrolyte in the battery may be poured out before the capacity recovery agent is injected, or the capacity recovery agent may be injected directly without pouring out the electrolyte. It is preferable to pour out the electrolyte before the capacity recovery agent is injected. Persons skilled in the art should understand that under a condition that the capacity degradation of the lithium-ion battery is severe, there is very little remaining free electrolyte inside the battery. In such cases, the capacity recovery agent can be directly injected into the battery. The capacity recovery agent can be injected in any method known to those skilled in the art, such as injection using a syringe.

In some embodiments, in step (4), the capacity recovery agent is allowed to react inside the lithium-ion secondary battery by standing at a temperature of 20-60° C., preferably 20-45° C. Typically, the standing time is 24-72 h, preferably 45-55 h. Under the reaction conditions, the capacity recovery agent sufficiently infiltrates the interior of the lithium-ion secondary battery to ensure capacity recovery of the lithium-ion secondary battery.

In some embodiments, in step (4), the capacity recovery agent is allowed to react inside the lithium-ion secondary battery by using ultrasound or heating. In some embodiments, ultrasound is applied at a frequency of 25 kHz to 80 kHz, preferably 40 kHz, for 2-4 h, preferably 2 h, to accelerate the reaction of the capacity recovery agent inside the lithium-ion secondary battery. In some embodiments, the capacity recovery agent may be heated in an oven at 20-45° C. for 2 h to accelerate the reaction of the capacity recovery agent inside the lithium-ion secondary battery. This accelerates the infiltration of the capacity recovery agent into an electrode plate in the lithium-ion secondary battery, speeds up the reaction rate, and improves the efficiency of capacity recovery of the secondary battery.

In some embodiments, in step (5), after the liquid mixture inside the lithium-ion secondary battery after reaction is poured out, an organic cleaning agent is injected for cleaning, followed by vacuum drying, and finally, the electrolyte is injected into the lithium-ion secondary battery. As a result, there is no residue of the capacity recovery agent inside the battery, ensuring the cycling stability and safety of the lithium-ion secondary battery after capacity recovery.

In some embodiments, the organic cleaning agent is the same as the low-viscosity solvent described above, preferably DMC. After cleaning with the organic cleaning agent, the secondary battery is usually vacuum dried under a vacuum degree of −0.08 MPa to −0.1 MPa at 20-45° C., preferably at room temperature. The vacuum drying is typically performed for 0.2-1 h, preferably 0.5 h.

In some embodiments, by implementing the method of this application, the lithium-ion secondary battery has a capacity recovery rate of 0.5%-25%.

The capacity recovery rate P of the secondary battery is calculated by the following formula:

$P=(Ca-Cb)/Cb*100\%$;

where
Cb is the discharge capacity of the battery before capacity recovery, in Ah; and
Ca is the discharge capacity of the battery after capacity recovery, in Ah.

The testing methods for Ca and Cb are as follows:

At 25° C., the lithium-ion secondary battery is charged at a constant current of 0.04 C to $U_{10}$, left standing for 5 min, and then discharged at 0.04 C to $U_{20}$, and the resulting discharge capacity is recorded as the initial discharge capacity C0, where values of $U_{10}$ and $U_{20}$ are shown in Table 4.

TABLE 4

$U_{10}$ and $U_{20}$ for different lithium-ion secondary batteries

| Positive electrode active material | $U_{10}$ (V) | $U_{20}$ (V) |
|---|---|---|
| Lithium iron phosphate | 3.65 | 2.5 |
| NCM532 | 4.25 | 2.8 |
| Lithium cobaltate | 4.25 | 2.8 |
| Lithium manganate | 4.25 | 2.5 |

The above steps are repeated three times for the same battery and the discharge capacity Cn of the battery after the nth cycle is recorded. The average of the three discharge capacities is taken as the discharge capacity Cb of the battery before capacity recovery. After the capacity recovery, the charging and discharging process is repeated three times and the average of the three discharge capacities is taken as the discharge capacity Ca of the battery after capacity recovery.

The testing method for the current state capacity C1 of the capacity-degraded lithium-ion secondary battery is the same as the testing method for Cb.

A second aspect of this application provides a lithium-ion secondary battery, characterized in that the lithium-ion secondary battery is obtained by the method described in the first aspect of this application, a positive electrode active material of the lithium-ion secondary battery being at least one of a lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and olivine-structured lithium-containing phosphate, optionally, the olivine-structured lithium-containing phosphate is at least one of lithium iron phosphate, a composite material of lithium iron phosphate and carbon, lithium manganese phosphate, a composite material of lithium manganese phosphate and carbon, lithium manganese-iron phosphate, and a composite material of lithium manganese-iron phosphate and carbon.

Normally, the secondary battery includes a positive electrode plate, a negative electrode plate, an electrolyte, and a separator. In a charge and discharge process of the battery, active ions are intercalated and deintercalated between the positive electrode plate and the negative electrode plate. The electrolyte conducts ions between the positive electrode plate and the negative electrode plate. The separator is disposed between the positive electrode plate and the negative electrode plate to mainly prevent a short circuit between positive and negative electrodes and to allow the ions to pass through.

[Positive Electrode Plate]

The positive electrode plate includes a positive electrode current collector and a positive electrode film layer disposed on at least one surface of the positive electrode current collector, where the positive electrode film layer includes the positive electrode active material according to the first aspect of this application.

For example, the positive electrode current collector includes two opposite surfaces in its thickness direction, and the positive electrode film layer is disposed on either or both of the two opposite surfaces of the positive electrode current collector.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the positive electrode active material may be a positive electrode active material for batteries well-known in the art. For example, the positive electrode active material is at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ (NCM333 for short), $LiNi_{0.5}Co_{0.2}Mn_{0.3}O_2$ (NCM523 for short), $LiNi_{0.5}Co_{0.25}Mn_{0.25}O_2$ (NCM211 for short), $LiNi_{0.6}Co_{0.2}Mn_{0.2}O_2$ (NCM622 for short), and $LiNi_{0.8}Co_{0.1}Mn_{0.1}O_2$ (NCM811 for short)), lithium nickel cobalt aluminum oxide (for example, $LiNi_{0.85}Co_{0.15}Al_{0.05}O_2$), and olivine-structured lithium-containing phosphate, and optionally, the olivine-structured lithium-containing phosphate may include, but is not limited to, lithium iron phosphate (for example, $LiFePO_4$ (LFP for short)), a composite material of lithium iron phosphate and carbon, lithium manganese phosphate (for example, $LiMnPO_4$), a composite material of lithium manganese phosphate and carbon, lithium manganese-iron phosphate, and a composite material of lithium manganese iron phosphate and carbon. However, this application is not limited to such materials, and may alternatively use other conventional well-known materials that can be used as positive electrode active materials for batteries. One of these positive electrode active materials may be used alone, or two or more of them may be used in combination.

In some embodiments, the positive electrode film layer further optionally includes a binder. For example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode film layer further optionally includes a conductive agent. For example, the conductive agent may include at least one of superconducting carbon, acetylene black, carbon black, Ketjen black, carbon dots, carbon nanotubes, graphene, and carbon nanofiber.

In some embodiments, the positive electrode plate may be prepared in the following manner: the constituents used for preparing the positive electrode plate, for example, the positive electrode active material, the conductive agent, the binder, and any other constituent, are dispersed in a solvent (for example, N-methylpyrrolidone) to form a positive electrode slurry; and the positive electrode slurry is applied onto the positive electrode current collector, followed by processes such as drying and cold pressing to obtain the positive electrode plate.

[Negative Electrode Plate]

The negative electrode plate includes a negative electrode current collector and a negative electrode film layer disposed on at least one surface of the negative electrode current collector, where the negative electrode film layer includes a negative electrode active material.

For example, the negative electrode current collector includes two opposite surfaces in its thickness direction, and the negative electrode film layer is disposed on either or both of the two opposite surfaces of the negative electrode current collector.

In some embodiments, the negative electrode current collector may be a metal foil current collector or a composite current collector. For example, for the metal foil, a copper foil may be used. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the negative electrode active material may be a well-known negative electrode active material used for a battery in the art. For example, the negative electrode active material may include at least one of the following materials: artificial graphite, natural graphite, soft carbon, hard carbon, a silicon-based material, a tin-based material, and lithium titanate. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials but may use other conventional materials that can be used as negative electrode active materials for batteries instead. One of these negative electrode active materials may be used alone, or two or more of them may be used in combination.

In some embodiments, the negative electrode film layer further optionally includes a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. The conductive agent may be selected from at least one of superconducting carbon, acetylene black, carbon black, Ketjen black, carbon dots, carbon nanotubes, graphene, and carbon nanofiber.

In some embodiments, the negative electrode film layer may further optionally include other promoters such as a thickener (for example, sodium carboxymethyl cellulose (CMC-Na)).

In some embodiments, the negative electrode plate may be prepared in the following manner: the constituents used for preparing the negative electrode plate, for example, the negative electrode active material, the conductive agent, the binder, and any other constituent, are dispersed in a solvent (for example, deionized water) to form a negative electrode slurry; and the negative electrode slurry is applied onto the negative electrode current collector, followed by processes such as drying and cold pressing to obtain the negative electrode plate.

[Electrolyte]

The electrolyte conducts ions between the positive electrode plate and the negative electrode plate. The electrolyte is not specifically limited to any particular type in this application, and may be selected based on needs. For example, the electrolyte may be in a liquid state, a gel state, or an all-solid state.

In some embodiments, the electrolyte is a liquid electrolyte. The liquid electrolyte includes an electrolytic salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis-trifluoromethanesulfonimide, lithium trifluoromethanesulfonat, lithium difluorophosphate, lithium difluorooxalate borate, lithium bisoxalatoborate, lithium difluorobisoxalate phosphate, and lithium tetrafluoro oxalate phosphate.

In some embodiments, the solvent may be selected from at least one of ethylene carbonate, propylene carbonate, methyl ethyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methanesulfonate, and diethyl sulfone.

In some embodiments, the liquid electrolyte further optionally includes an additive. For example, the additive may include a negative electrode film-forming additive or a positive electrode film-forming additive or may include an additive capable of improving some performance of the battery, for example, an additive for improving overcharge performance of the battery, or an additive for improving high-temperature or low-temperature performance of the battery.

[Separator]

In some embodiments, the secondary battery further includes a separator. The separator is not limited to any particular type in this application and may be any well-known porous separator with good chemical stability and mechanical stability.

In some embodiments, a material of the separator may be selected from at least one of glass fiber, non-woven fabric, polyethylene, polypropylene, and polyvinylidene fluoride. The separator may be a single-layer film or a multi-layer composite film and is not particularly limited. When the separator is a multi-layer composite film, all layers may be made of same or different materials, which is not particularly limited.

In some embodiments, the positive electrode plate, the negative electrode plate, and the separator may be made into an electrode assembly through winding or lamination.

In some embodiments, the secondary battery may include an outer package. The outer package may be used for packaging the electrode assembly and the electrolyte.

In some embodiments, the outer package of the secondary battery may be a hard shell, for example, a hard plastic shell, an aluminum shell, or a steel shell. The outer package of the secondary battery may alternatively be a soft package, for example, a soft pouch. Material of the soft pack may be plastic, which, for example, may be polypropylene, polybutylene terephthalate, and polybutylene succinate. Preferably, the outer package of the secondary battery is a soft pouch.

This application does not impose any special limitations on a shape of the secondary battery, and the secondary battery may be cylindrical, rectangular, or of any other shapes.

In some embodiments, secondary battery products of different shapes include a box and the secondary battery of the present invention encapsulated in the box. The box can include a shell and a cover plate. The housing may include a base plate and side plates connected to the base plate, and the base plate and the side plates enclose an accommodating cavity. The housing has an opening communicating with the accommodating cavity, and the cover plate can cover the opening to close the accommodating cavity. A positive electrode plate, a negative electrode plate, and a separator may be made into an electrode assembly through winding or stacking. The electrolyte infiltrates the electrode assembly to form the secondary battery unit of the present invention. The secondary battery unit is encapsulated in the accommodating cavity. The secondary battery may include one or more secondary battery units, and persons skilled in the art may make choices according to actual requirements.

In some embodiments, the secondary battery may be assembled into a battery module, and the battery module may include one or more secondary batteries. The specific quantity may be chosen by persons skilled in the art according to use and capacity of the battery module.

In the battery module, the plurality of secondary batteries may be provided in a length direction of the battery module. Certainly, the batteries may alternatively be arranged in any other manners. Further, the plurality of secondary batteries may be fastened by using fasteners.

Optionally, the battery module may further include a housing with an accommodating space, and the plurality of secondary batteries are accommodated in the accommodating space.

In some embodiments, the battery module may be further assembled into a battery pack, and the battery pack may include one or more battery modules. The specific quantity may be chosen by persons skilled in the art according to use and capacity of the battery pack.

The battery pack may include a battery box and a plurality of battery modules arranged in the battery box. The battery box includes an upper box body and a lower box body. The upper box body can cover the lower box body to form an enclosed space for accommodating the battery modules. The plurality of battery modules may be arranged in the battery box in any manner.

In addition, this application further provides an electric apparatus. The electric apparatus includes at least one of the secondary battery, the battery module, or the battery pack provided in this application. The secondary battery, the battery module, or the battery pack may be used as a power source for the electric apparatus or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, or the like, but is not limited thereto.

The secondary battery, the battery module, or the battery pack may be selected for the electric apparatus based on requirements for using the electric apparatus.

This electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

In another example, the apparatus may be a mobile phone, a tablet computer, a notebook computer, or the like. The apparatus usually requires to be light and thin, and a secondary battery may be used as a power source.

Examples

The following describes examples of this application. The examples described below are illustrative and only used for explaining this application, and cannot be construed as limitations on this application. Examples whose technical solutions or conditions are not specified are made in accordance with technical solutions or conditions described in literature in the field or made in accordance with product instructions. The reagents or instruments used are all conventional products that are commercially available if no manufacturer is indicated.

Example 1

(1) A capacity-degraded lithium-ion secondary battery was taken; an active lithium loss rate P1 of the secondary battery was measured as 20% according to the method in the specification, and a discharge capacity C1 of the secondary battery in the current state was measured as 116 mAh. The tested battery cell was fully discharged, meaning that a capacity C3 to be charged to the secondary battery before capacity recovery was 0. Then a capacity C required to be recovered for the capacity-degraded lithium-ion secondary battery was calculated as 29 mAh according to the following formula:

$C=C2+C3-C1$, where $C2=C1/(1-P1)$, where

P1 was the active lithium loss rate of the capacity-degraded lithium-ion secondary battery;

C1 was the discharge capacity of the capacity-degraded lithium-ion secondary battery in a current state;

C2 is the discharge capacity of the lithium-ion secondary battery under a condition that the positive electrode material maximally accommodates active lithium; and C3 is the capacity required to be charged to the capacity-degraded lithium-ion secondary battery by charging before capacity recovery; where each of the above capacities was measured in Ah.

(2) A mass $m_1$ of tetramethyl-p-phenylenediamine to be added was calculated as 0.178 g based on the capacity C to be recovered for the secondary battery obtained in step (1):

$m_1=C*M_1*1000/(M_{li}*3860)$, where $M_1$ represents the relative molecular mass of the p-phenylenediamine compound, in g/mol.

$M_{li}$ represents the relative atomic mass of lithium atoms, in g/mol, and 3860 represents the gram capacity of lithium metal, in mAh/g.

A mass $m_2$ of lithium hexafluorophosphate to be added was calculated as 0.164 g:

$m_2=C*M_2*1000/(n*M_{li}*3860)$, where $M_2$ represented the relative molecular mass of the lithium salt, in g/mol, n represented the number of lithium atoms in the lithium salt, $M_{li}$ represents the relative atomic mass of Li atoms, in g/mol, and 3860 represents the gram capacity of lithium metal, in mAh/g.

The above amounts of tetramethyl-p-phenylenediamine and lithium hexafluorophosphate were dissolved in 16.058 g of a mixed solvent of ethylene carbonate and dimethyl carbonate with a mass ratio of 3:7, to provide a capacity recovery agent.

(3) One corner of a pouch-type secondary battery cell was cut open using a tool to pour out an electrolyte. Then 10 g of the capacity recovery agent obtained in step (2) was injected into the lithium-ion secondary battery cell using a syringe. Then the battery cell was sealed using a heat sealer under the sealing conditions of 140° C. for 10 s.

(4) The battery cell was left at 25° C. for 48 h to allow the capacity recovery agent to react inside the lithium-ion secondary battery.

(5) The corner of the battery cell in step (4) was cut open to pour out the liquid mixture inside the lithium-ion secondary battery after reaction. Then 10 g of DMC was injected into the battery cell for soaking for 30 min, and then was poured out. The operation was repeated six times. Then the battery cell was dried at −0.1 MPa vacuum and 25° C. for 30 min. Then the electrolyte was injected into the battery cell. Then the battery cell was sealed using a heat sealer under the sealing conditions of 140° C. for 10 s.

Examples 2-18

The same steps as in Example 1 were carried out, except for changes to the solvent types, masses, and ratios of different solvents in the mixed solvent of the capacity recovering agent, the charging state of the battery before recovery, and the reaction conditions. See Table 1 for details.

Comparative Example 1

The same steps as Example 1 were followed, except for omitting step (5).

Comparative Example 2

The same steps as Example 1 were followed, except that the p-phenylenediamine compound was not added.

Comparative Example 3

The same steps as Example 1 were followed, except that the lithium salt was not added.

Comparative Example 4

The same steps as Example 1 were followed, except that the p-phenylenediamine compound and the lithium salt were not added.

TABLE 1

| No. | Battery type | P-phenylenediamine compound/g | | | Lithium salt/g | | Solvent | | Charging state of battery before capacity recovery C3/mAh | Reaction conditions of capacity recovery agent |
| --- | --- | --- | --- | --- | --- | --- | --- | --- | --- | --- |
| | | Tetra methyl-p-phenylene-diamine | N,N-Dimethyl-p-phenylenediamine | N,N-Diethyl-p-phenylenediamine | Lithium hexafluoro-phosphate | Lithium perchlorate | Mass/g | Type and ratio | | |
| 1 | Lithium iron phosphate | 0.178 | | | 0.164 | | 16.058 | EC:DMC = 30:70 | 0 | Standing at 25° C. for 48 h |
| 2 | Lithium iron phosphate | 0.178 | | | 0.164 | | 32.458 | EC:DMC = 30:70 | 0 | Standing at 25° C. for 48 h |
| 3 | Lithium iron phosphate | 0.178 | | | 0.164 | | 7.858 | EC:DMC = 30:70 | 0 | Standing at 25° C. for 48 h |
| 4 | Lithium iron phosphate | 0.178 | | | 0.164 | | 3.758 | EC:DMC = 30:70 | 0 | Standing at 25 °C. for 48 h |
| 5 | Lithium iron phosphate | | 0.147 | | 0.164 | | 16.089 | EC:DMC = 30:70 | 0 | Standing at 25° C. for 48 h |
| 6 | Lithium iron phosphate | | | 0.178 | 0.164 | | 16.058 | EC:DMC = 30:70 | 0 | Standing at 25° C. for 48 h |
| 7 | Lithium iron phosphate | 0.178 | | | | 0.115 | 11.207 | EC:DMC = 30:70 | 0 | Standing at 25° C. for 48 h |
| 8 | NCM 532 | 0.178 | | | 0.164 | | 16.058 | EC:DMC = 30:70 | 0 | Standing at 25° C. for 48 h |
| 9 | Lithium cobaltate | 0.178 | | | 0.164 | | 16.058 | EC:DMC = 30:70 | 0 | Standing at 25° C. for 48 h |
| 10 | Lithium manganate | 0.178 | | | 0.164 | | 16.058 | EC:DMC = 30:70 | 0 | Standing at 25° C. for 48 h |
| 11 | Lithium iron phosphate | 0.178 | | | 0.164 | | 16.058 | EC:DMC = 25:75 | 0 | Standing at 25° C. for 48 h |
| 12 | Lithium iron phosphate | 0.178 | | | 0.164 | | 16.058 | EC:DMC = 20:80 | 0 | Standing at 25° C. for 48 h |
| 13 | Lithium iron phosphate | 0.178 | | | 0.164 | | 16.058 | EC:DMC = 15:85 | 0 | Standing at 25° C. for 48 h |
| 14 | Lithium iron phosphate | 0.178 | | | 0.164 | | 16.058 | EC:DMC = 10:90 | 0 | Standing at 25° C. for 48 h |
| 15 | Lithium iron phosphate | 0.178 | | | 0.164 | | 16.058 | EC:DMC = 30:70 | 8 mAh | Standing at 25° C. for 48 h |
| 16 | Lithium iron phosphate | 0.178 | | | 0.164 | | 16.058 | EC:DMC = 30:70 | 15 mAh | Standing at 25° C. for 48 h |
| 17 | Lithium iron phosphate | 0.178 | | | 0.164 | | 16.058 | EC:DMC = 30:70 | 0 | Ultra-sonica-tion at 25° C. for 2 h, |

TABLE 1-continued

| No. | Battery type | P-phenylenediamine compound/g | | | Lithium salt/g | | Solvent | | Charging state of battery before capacity recovery C3/mAh | Reaction conditions of capacity recovery agent |
| --- | --- | --- | --- | --- | --- | --- | --- | --- | --- | --- |
| | | Tetra methyl-p-phenylene-diamine | N,N-Dimethyl-p-phenylenediamine | N,N-Diethyl-p-phenylenediamine | Lithium hexafluoro-phosphate | Lithium perchlorate | Mass/g | Type and ratio | | |
| 18 | Lithium iron phosphate | 0.178 | | | 0.164 | | 16.058 | EC:DMC = 30:70 | 0 | and then standing for 46 h Ultra-sonica-tion at 25° C. for 4 h, and then standing for 44 h |
| 19 | Lithium iron phosphate | 0.178 | | | 0.164 | | 16.058 | EC:DMC = 30:70 | 0 | Heating at 40° C. for 2 h, and then standing for 46 h |
| 20 | Lithium iron phosphate | 0.178 | | | 0.164 | | 16.058 | EC:DMC = 30:70 | 0 | Heating at 60° C. for 2 h, and then standing for 46 h |

Battery Performance Test

Discharge capacities of the batteries before and after capacity recovery in the above examples and comparative examples were tested according to the methods described in the specification, and a corresponding capacity recovery rate P was calculated. The results were recorded in Table 2.

TABLE 2

| No. | Concentration/weight percentage of p-phenylenediamine in the capacity recovery agent (%) | Concentration/weight percentage of lithium salt in the capacity recovery agent (%) | Active lithium loss rate P1 before battery capacity recovery | Capacity C to be recovered for the battery (mAh) | Discharge capacity Cb before battery capacity recovery (mAh) | Discharge capacity Ca after battery capacity recovery (mAh) | Capacity recovery rate P | Cycle retention rate after 500 cycles at 25° C. |
| --- | --- | --- | --- | --- | --- | --- | --- | --- |
| Example 1 | 1.1% | 1.0% | 20% | 29 | 116 | 136 | 17% | 89% |
| Example 2 | 0.5% | 0.5% | 20% | 29 | 115 | 123 | 7% | 88% |
| Example 3 | 2.2% | 2.0% | 20% | 29 | 116 | 130 | 12% | 87% |
| Example 4 | 4.3% | 4.0% | 20% | 29 | 115 | 119 | 5% | 88% |
| Example 5 | 0.9% | 1.0% | 20% | 29 | 116 | 133 | 15% | 89% |
| Example 6 | 1.1% | 1.0% | 20% | 29 | 115 | 129 | 12% | 90% |

TABLE 2-continued

| No. | Concentration/ weight percentage of p-phenylenediamine in the capacity recovery agent (%) | Concentration/ weight percentage of lithium salt in the capacity recovery agent (%) | Active lithium loss rate P1 before battery capacity recovery | Capacity C to be recovered for the battery (mAh) | Discharge capacity Cb before battery capacity recovery (mAh) | Discharge capacity Ca after battery capacity recovery (mAh) | Capacity recovery rate P | Cycle retention rate after 500 cycles at 25° C. |
|---|---|---|---|---|---|---|---|---|
| Example 7 | 1.5% | 1.0% | 20% | 29 | 116 | 132 | 14% | 88% |
| Example 8 | 1.1% | 1.0% | 20% | 29 | 116 | 134 | 16% | 88% |
| Example 9 | 1.1% | 1.0% | 20% | 29 | 115 | 133 | 16% | 89% |
| Example 10 | 1.1% | 1.0% | 20% | 29 | 116 | 132 | 15% | 87% |
| Example 11 | 1.1% | 1.0% | 20% | 29 | 116 | 135 | 19% | 88% |
| Example 12 | 1.1% | 1.0% | 20% | 29 | 116 | 137 | 18% | 89% |
| Example 13 | 1.1% | 1.0% | 20% | 29 | 116 | 139 | 16% | 88% |
| Example 14 | 1.1% | 1.0% | 20% | 29 | 116 | 139 | 15% | 86% |
| Example 15 | 1.1% | 1.0% | 20% | 29 | 116 | 140 | 21% | 88% |
| Example 16 | 1.1% | 1.0% | 20% | 29 | 116 | 143 | 23% | 86% |
| Example 17 | 1.1% | 1.0% | 20% | 29 | 116 | 139 | 20% | 85% |
| Example 18 | 1.1% | 1.0% | 20% | 29 | 116 | 142 | 22% | 83% |
| Example 19 | 1.1% | 1.0% | 20% | 29 | 116 | 138 | 19% | 90% |
| Example 20 | 1.1% | 1.0% | 20% | 29 | 116 | 140 | 21% | 91% |
| Comparative Example 1 | 1.1% | 1.0% | 20% | 29 | 116 | 130 | 12% | 79% |
| Comparative Example 2 | 0% | 1.0% | 20% | 29 | 116 | 115 | −1% | 66% |
| Comparative Example 3 | 1.1% | 0% | 20% | 29 | 116 | 116 | 0% | 64% |
| Comparative Example 4 | 0% | 0% | 20% | 29 | 116 | 116 | 0% | 67% |

Based on the above results, it can be seen that the lithium-ion secondary batteries of the present invention in examples 1-20 achieved ideal capacity recovery rates after capacity recovery using the method of the present invention. Furthermore, the cycle retention rates of the batteries after 500 cycles at 25° C. remained at a high level (above 80%).

In contrast, in comparative example 1, the reaction mixture after reaction of the capacity recovery agent was directly used instead of being poured out, the capacity retention rate was lower than all the examples.

In comparative examples 2-4, lithium salts or diphenylamine compounds were not included in the capacity recovery agent, the capacity of the battery was essentially unchanged after the battery was treated using the same method as that of the present invention, and the desired effect of battery capacity recovery was not achieved.

It should be noted that this application is not limited to the foregoing embodiments. The foregoing embodiments are merely examples, and embodiments having substantially the same constructions and the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

What is claimed is:

1. A method for capacity recovery of lithium-ion secondary battery, characterized by comprising the following steps:
   (1) providing a capacity-degraded lithium-ion secondary battery;
   (2) providing a capacity recovery agent, the capacity recovery agent comprising a p-phenylenediamine compound, a lithium salt, and an organic solvent, and the organic solvent being used to dissolve the p-phenylenediamine compound and the lithium salt;
   (3) injecting the capacity recovery agent into the lithium-ion secondary battery;
   (4) enabling the capacity recovery agent to react inside the lithium-ion secondary battery; and
   (5) pouring out the liquid mixture inside the lithium-ion secondary battery after reaction and injecting an electrolyte into the lithium-ion secondary battery.

2. The method according to claim 1, characterized in that in step (1), the capacity-degraded lithium-ion secondary battery is an active lithium-degraded battery, and a capacity required to be recovered for the capacity-degraded lithium-ion secondary battery is C, a calculation method for C being as follows:

$C=C2+C3-C1,$ wherein $C2=C1/(1-P1),$ wherein

P1 is active lithium loss rate of the capacity-degraded lithium-ion secondary battery;

C1 is discharge capacity of the capacity-degraded lithium-ion secondary battery in a current state;

C2 is discharge capacity of the lithium-ion secondary battery under a condition that the positive electrode material maximally accommodates active lithium; and C3 is capacity required to be charged to the capacity-degraded lithium-ion secondary battery by charging before capacity recovery; wherein each of the above capacities is measured in Ah.

3. The method according to claim 1, characterized in that the active lithium loss rate P1 of the capacity-degraded lithium-ion secondary battery is greater than or equal to 5%.

4. The method according to claim 2, characterized in that in step (2), a mass $m_1$ of the aniline compound to be added to the capacity recovery agent and the capacity C required to be recovered for the capacity-degraded lithium-ion secondary battery satisfy:

$m_1=C*M_1*1000/(M_{li}*3860)$, wherein $M_1$ represents the relative molecular mass of the p-phenylenediamine compound in g/mol, $M_{li}$ represents the relative atomic mass of lithium atoms in g/mol, and 3860 represents the gram capacity of lithium metal in mAh/g.

5. The method according to claim 2, characterized in that in step (2), a mass $m_2$ of the lithium salt to be added to the capacity recovery agent and the capacity C required to be recovered for the capacity-degraded lithium-ion secondary battery satisfy:

$m_2=C*M_2*1000/(n*M_{li}*3860)$, wherein $M_2$ represented the relative molecular mass of the lithium salt in g/mol, n represents the number of lithium atoms in the lithium salt, $M_{li}$ represents the relative atomic mass of Li atoms, in g/mol, and 3860 represents the gram capacity of lithium metal, in mAh/g.

6. The method according to claim 1, characterized in that the p-phenylenediamine compound is selected from compounds represented by formula 1 and/or formula 2:

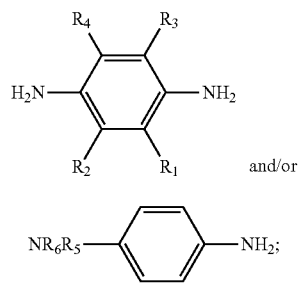

Formula 1 and/or

Formula 2 wherein $R_1$, $R_2$, $R_3$ and $R_4$ are each independently a straight-chain or branched-chain alkyl group having 1 to 3 carbon atoms or hydrogen; and $R_5$ and $R_6$ are each independently hydrogen or a straight-chain or branched-chain alkyl group having 1 to 3 carbon atoms.

7. The method according to claim 1, characterized in that the lithium salt is selected from one or more of lithium perchlorate, lithium tetrafluoroborate, lithium hexafluoroarsenate, lithium hexafluorophosphate, lithium bisoxalate borate, lithium difluorooxalate borate, lithium bisdifluorosulfonimide, LiCl, and LiBr.

8. The method according to claim 1, characterized in that in the capacity recovery agent, the p-phenylenediamine compound has a percentage of 0.5-15 wt %, and the lithium salt has a percentage of 0.5-15 wt %, preferably 0.5-6 wt %; wherein all the percentages are based on a total mass of the capacity recovery agent.

9. The method according to claim 1, characterized in that in step (2), the organic solvent comprises a cyclic carbonate and a low-viscosity solvent.

10. The method according to claim 9, characterized in that the cyclic carbonate is ethylene carbonate (EC), propylene carbonate (PC), or a combination thereof; and the cyclic carbonate has a percentage of 10-30 wt % based on a total mass of the organic solvent.

11. The method according to claim 9, characterized in that the low-viscosity solvent is one or more of dimethyl carbonate, diethyl carbonate, methyl ethyl carbonate, methyl propyl carbonate, methyl formate, ethyl formate, methyl acetate, ethyl acetate, propyl propionate, ethyl butyrate, ethyl propionate, propyl butyrate, tetrahydrofuran, and 1,3-dioxocyclopentane; and the low-viscosity solvent has a percentage of 70-90 wt % based on the mass of the organic solvent.

12. The method according to claim 1, characterized in that in step (4), the capacity recovery agent is enabled to react inside the lithium-ion secondary battery by leaving the lithium-ion secondary battery standing at 20-60° C.

13. The method according to claim 1, characterized in that in step (4), the capacity recovery agent is enabled to react inside the lithium-ion secondary battery by ultrasound or heating.

14. The method according to claim 1, characterized in that in step (5), after the liquid mixture inside the lithium-ion secondary battery after reaction is poured out, an organic cleaning agent is injected for cleaning, followed by vacuum drying, and finally, the electrolyte is injected into the lithium-ion secondary battery.

15. A lithium-ion secondary battery, characterized in that the lithium-ion secondary battery is a lithium-ion secondary battery obtained by the method according to claim 1, wherein a positive electrode active material of the lithium-ion secondary battery is at least one of a lithium cobalt oxide, a lithium nickel oxide, a lithium manganese oxide, a lithium nickel cobalt oxide, a lithium manganese cobalt oxide, a lithium nickel-manganese oxide, a lithium nickel cobalt manganese oxide, a lithium nickel cobalt aluminum oxide, and olivine-structured lithium-containing phosphate, and optionally, the olivine-structured lithium-containing phosphate is at least one of lithium iron phosphate, a composite material of lithium iron phosphate and carbon, lithium manganese phosphate, a composite material of lithium manganese phosphate and carbon, lithium manganese-iron phosphate, and a composite material of lithium manganese-iron phosphate and carbon.

16. A battery module, characterized by comprising the secondary battery according to claim 15.

17. A battery pack, characterized by comprising the battery module according to claim 16.

18. An electric apparatus, characterized by comprising the lithium-ion secondary battery according to claim 15.

* * * * *